United States Patent Office 3,565,940
Patented Feb. 23, 1971

3,565,940
PROCESS FOR PREPARING ACETONITRILE
Patrick Michael Brown, Catonsville, and James Michael Maselli, Ellicott City, Md., assignors to W. R. Grace & Co., New York, N.Y., a corporation of Connecticut
No Drawing. Filed Feb. 20, 1969, Ser. No. 801,143
Int. Cl. C07c *121/18*
U.S. Cl. 260—465.3         5 Claims

ABSTRACT OF THE DISCLOSURE

A method of preparing acetonitrile by the catalytic ammoniation of ethylene and/or propylene by passing a mixture of ethylene and/or propylene and ammonia through a bed of a catalyst at a temperature of about 300–600° C. wherein the catalyst is a nitride of tungsten or iron.

---

The preparation of nitriles by the addition of hydrogen cyanide to an alkene in the presence of an alumina catalyst and at temperatures of 350–400° C. is well known. The present process is advantageous over the process of the prior art in that the reaction is simplified and the yield can be improved by separation and recycling of the reactants to the reactor. The reaction is carried out at atmospheric pressure over nitrides of tungsten or iron that have a high surface area.

The only essential reactants are ethylene and/or propylene and ammonia. The ethylene and/or propylene need not be pure. It can contain appreciable amounts, up to about 20%, of contaminants such as higher or lower alkanes without interfering with the desired reaction.

Ammonia is fed as dry ammonia to the system; the presence of oxygen is to be avoided since the nitride catalysts are deactivated by oxidation of nitrides. The ratio of reactants vary between 1 to 2 moles of ammonia per a mole of ethylene of propylene.

The catalysts are nitrides of tungsten or iron. The nitrides of the other elements of the same group do not give appreciable conversions to the nitrile. The nitride catalysts have surface areas of about 10 to 60 square meters per gram. These catalysts are prepared in any of several reactions. Tungsten nitride can be conveniently prepared, for example, by contacting a tungstic acid gel with ammonia at a temperature of 600–700° C. for periods of time up to 80 hours.

Iron nitride is conveniently prepared by preparing an iron hydroxide hydrogel and reducing the hydrogel to the nitride in the presence of ammonia. This is accomplished by passing ammonia through a bed of the hydroxide at a rate of 100 cc. per minute and at a temperature of 450° C. for a period of about three days.

The reaction to form acetonitrile is preferably carried out at a temperature of about 400–450° C. The contact time can range from about 2 to about 40 seconds with a cold contact time of 10–20 seconds being preferred. The reaction is preferably carried out at or above atmospheric pressure.

The products of the reaction are analyzed by a gas chromatograph using conventional gas chromatography techniques. The laboratory reactor for testing the catalysts at atmospheric pressure consists of a 1 cm. ID quartz tube inserted in a furnace connected to flow meters and pressure gauges as well as sources of ethylene and/or propylene and ammonia. The gases are first preheated by passage through a furnace over an inert heat exchange material. The gas is then conducted through heated piping into a quartz reactor tube and through a catalyst bed supported in the tube between two plugs of quartz wool. The gases are removed from the reactor and transferred to a gas chromatograph through a heated line.

Our invention is further illustrated by the following specific but non-limiting examples.

EXAMPLE 1

This example illustrates the preparation of acetonitrile using tungsten nitride as the catalyst.

One pound of sodium tungstate was added to 6 liters of deionized water. This solution was added with rapid stirring to 2.54 liters of 10 N nitric acid. The resultant tungstic acid gel was reslurried and washed successively three 8 liter increments of 0.3 N nitric acid and finally with 6 liters of deionized water. The amorphous material had a surface area of 22.8 square meters per gram (BET) after drying at 120° C. A 10 cc. sample of this material (1 mm. particle size) was placed in a quartz reactor and heated slowly to 450° C. in the presence of hydrogen and ammonia followed by ammonia only at 600° C. for 78 hours. The resultant nitride had a surface area of 12.8 square meters per gram. The temperature of the reactor was dropped to 500° C. and ammonia and ethylene were passed over the catalyst. The ammonia flow rate was 80 cc. per minute and the ethylene flow rate 5 cc. per minute. The reaction was allowed to run for a period of ½ hour. The ethylene flow rate was increased in 10 cc. increments up to about 75 cc. per minute. At the end of this time, the single pass conversion of ethylene to acetonitrile was 30%. By separation of the acetonitrile and recycling of unreacted ammonia and hydrocarbons, the overall yield can be raised to 80%.

EXAMPLE 2

This example illustrates the preparation of acetonitrile using iron nitride as the catalyst.

An 8:1 water-ammonia solution was added with rapid stirring to a solution of ferric nitrate (2 lbs. of

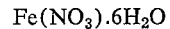

$$Fe(NO_3) \cdot 6H_2O$$

in 4 liters of water) so as to maintain the pH of the final slurry between 6.5 and 8.2 pH units. The final pH being 7.6. The precipitate was filtered, washed, and dried at 120° C. The surface area of this material was 307 m.²/gm. (BET). A 10 cc. portion of 1 mm. particles was placed in a quartz reactor tube as previously described. The sample was reduced to $Fe_2N \cdot Fe_3N$ by passing ammonia through the hydrogel bed at a rate greater than 100 cc. per minute and a temperature of 450° C. for a period of 72 hours. The temperature in the reactor was decreased to 200° C. and ethylene at a flow rate of 20 cc. per minute and ammonia at a flow rate of 40 cc. per minute were passed through the reactor. The temperature was increased incrementally to 300° C., the initial temperature at which acetonitrile and hydrogen cyanide began forming. After an initial activation period of 3 hours, the temperature was increased to 450° C. The single pass conversion amounted to 30% acetonitrile and hydrogen cyanide. The acetonitrile hydrogen cyanide ratio being approximately 2:1.

EXAMPLE 3

This example illustrates the preparation of acetonitrile using propylene instead of ethylene as the feed gas.

This reaction was carried out in the atmospheric pressure reactor described above. The propylene and ammonia were passed over a tungsten nitride catalyst using the technique described in Example 1 above. The contact time was about 7.5 seconds. The temperature initially was 500° C. but was increased to 600° C. and was maintained at that temperature for about 8 hrs. The yield of acetonitrile was about 30% which is comparable to the yield obtained when ethylene was used as the feed gas. Increasing the temperature from 500–600° C. improved the yield.

EXAMPLE 4

Some of the parameters of the preparation of acetonitrile using tungsten nitride as the catalyst were determined.

In this experiment, 10 cc. of a tungsten oxide gel was placed in the quartz reactor and slowly heated to 650° C. with ammonia being passed through the bed of the tungstic oxide gel. The temperature was maintained at 650° C. for a period of 78 hours. At the end of this period, the temperature was decreased to 450° C. and ethylene was passed into the system at a rate of 10 cc. per minute. Ammonia was fed to the system at a rate of 125 cc. per minute. The production of acetonitrile was detected after one hr. The reaction was continued for a period of 6 days. The catalyst remained active during this period. Several changes were made in the system in an attempt to optimize yields. The ratio of ammonia to ethylene was changed from 2 to 1 to 1 to 1. The temperature was changed from 400° C. to 750° C. The best results were obtained at temperature of 600–700° C. where yields of about 50% or more acetonitrile were recovered. However, at the higher temperature, appreciable deactivation occurs through a coking process. On the basis of this data, it was concluded that the optimum ratio of ethylene to ammonia was 1 to 1 and the optimum temperature 500–600° C.

Obviously, many modifications and variations of the invention may be made without departing from the essence and scope thereof and only such limitations should be applied as are indicated in the appended claims.

What is claimed is:

1. A process for preparing acetonitrile comprising passing a mixture of alkenes selected from the group consisting of ethylene, propylene and mixtures thereof and dry ammonia in a molar ratio of 1 to 2 moles of dry ammonia per mole of alkene through a bed of a catalyst consisting essentially of the nitride of tungsten or iron at a temperature of about 400–600° C. with a contact time of 2 to 70 seconds and recovering the acetonitrile product, said process being carried out in the absence of oxygen and said nitrile catalyst having a surface area of about 10 to 60 square meters per gram.

2. The process according to claim 1 wherein the alkene is ethylene and the catalyst is iron nitride.

3. The process according to claim 1 wherein the alkene is ethylene and the catalyst is tungsten nitride.

4. The process according to claim 1 wherein the alkene is propylene and the catalyst is tungsten nitride.

5. A process for the preparation of acetonitrile which comprises feeding a mixture of ethylene and dry ammonia in a molar ratio of 1 to 2 moles of dry ammonia per mole of ethylene through a bed of tungsten nitride catalyst at a temperature of about 450° C. with a contact time of 20 to 50 seconds, and recovering the acetonitrile product, said process being carried out in the absence of oxygen and said nitrile catalyst having a surface area of about 10 to 60 square meters per gram.

References Cited

UNITED STATES PATENTS 2,496,659   2/1950   Denton et al. _____ 260—465.3

JOSEPH P. BRUST, Primary Examiner

U.S. Cl. X.R.

252—438